United States Patent [19]

Lassally

[11] Patent Number: 4,509,721
[45] Date of Patent: Apr. 9, 1985

[54] OPERATING MECHANISM FOR A HIGH-PRESSURE VALVE HAVING A VALVE PASSAGE OF RELATIVELY SMALL WIDTH

[75] Inventor: Gunter M. Lassally, Amsterdam, Netherlands

[73] Assignee: Amstelstaal B.V., Netherlands

[21] Appl. No.: 501,491

[22] Filed: Jun. 6, 1983

[30] Foreign Application Priority Data

Jun. 22, 1982 [NL] Netherlands ............................ 8202513

[51] Int. Cl.³ ............................................. F16K 41/10
[52] U.S. Cl. ................. 251/335 B; 251/256; 251/263; 251/335 A
[58] Field of Search ............... 251/335 B, 335 A, 252, 251/256, 263

[56] References Cited

U.S. PATENT DOCUMENTS

| | | | |
|---|---|---|---|
| 900,598 | 10/1908 | Schuermann | 251/256 |
| 1,992,902 | 2/1935 | McIntosh | 251/335 B |
| 3,288,431 | 11/1966 | Inazawa | 251/256 |
| 3,326,512 | 6/1967 | Clarke | 251/335 B |
| 3,656,709 | 4/1972 | Schufflebarger et al. | 251/263 |
| 4,343,456 | 8/1982 | Zitzloff | 251/263 |
| 4,377,182 | 3/1983 | Semon | 251/256 |

FOREIGN PATENT DOCUMENTS

| | | | |
|---|---|---|---|
| 571561 | 3/1959 | Belgium | 251/335 B |
| 373832 | 8/1939 | Italy | 251/335 B |

Primary Examiner—A. Michael Chambers
Attorney, Agent, or Firm—Kane, Dalsimer, Kane, Sullivan and Kurucz

[57] ABSTRACT

The invention generally relates to high-pressure valves of the type having a valve passage of relatively small width, for instance in the order of 10 mm or less, and a movable valve element for opening and closing said passage. More particularly, the invention relates to an operating mechanism for moving the valve element between its open and closed position.

6 Claims, 1 Drawing Figure

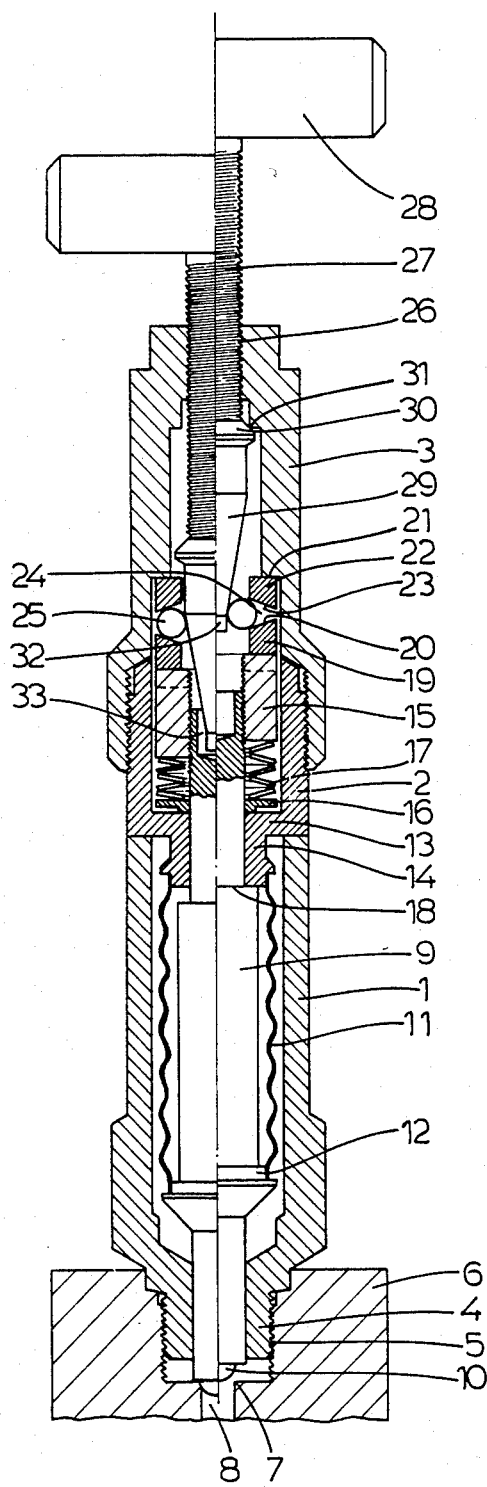

OPERATING MECHANISM FOR A HIGH-PRESSURE VALVE HAVING A VALVE PASSAGE OF RELATIVELY SMALL WIDTH

BACKGROUND OF THE INVENTION

In high-pressure valves of this type, as used for instance in nuclear reactors, the valve element is generally carried at one end of a valve stem which is slidably received in a housing mounted on the body of the valve, sealing means being provided to seal the valve stem with respect to this housing. In a conventional embodiment of such a high-pressure valve the valve stem is secured to or forms part of a threaded operating spindle projecting from the housing and carrying a handgrip for the manual operation of the valve. As a consequence of the small width of the valve passage, the valve element and the valve stem and operating spindle have a correspondingly small diameter and it will be clear that it is not possible to mount a heavy hand wheel or similar handgrip on such a small sized spindle. In many cases a bellows seal or diaphragm seal is employed as sealing means for the valve stem. However, for structural reasons the diameter of such a bellows or diaphragm seal can not be smaller than approximately 25 mm which means that this seal has a substantially larger diameter than the valve element. As a consequence, the axial force exerted by the pressure of the fluid to be controlled in the opening direction of the valve is in fact determined by the cross-sectional area of the bellows or the diaphragm. As a result thereof, the operating force to be applied for closing the valve becomes very great whereby not only twisting or bending of the relatively light sized spindle can occur but also the operation by means of the relatively small handgrip becomes heavy and difficult. Furthermore, the manually operated high-pressure valves with bellows or diaphragm seals generally have a very small stroke of the operating spindle between the closed and the open position. For this reason it is difficult to provide a clear signalling means to indicate the position to which the valve has been moved.

SUMMARY OF THE INVENTION

It is accordingly an object of the invention to provide an operating mechanism for a high-pressure valve of the kind described which obviates the above-discussed disadvantages of the prior art valves.

More particularly it is an object of the invention to provide such an operating mechanism which requires only little force for its manipulation so as to effectively prevent bending or twisting of the valve stem and operating spindle when closing the valve.

A further object of the invention is to provide an operating mechanism of the kind described which provides for a relatively large stroke of the operating spindle, thereby facilitating the provision of means for clearly indicating the position of the valve.

The operating mechanism for a high-pressure valve according to the invention generally comprises a housing adapted to be mounted on the valve body and slidingly receiving the valve stem as well as sealing means, such as a bellows seal, for the stem. Two similar thrust rings are oppositely arranged in the housing, one ring being stationary and the other ring being axially slidable and each one of said two rings having on its side facing the other ring an inwardly bevelled conical shape whereby the two end faces enclose an annular space of radially inwardly increasing axial width in which annular space a plurality of ball members are arranged between the conical thrust ring faces. The valve stem on its side opposite of the valve element axially engages the slidable thrust ring and a spring urges the valve stem and thereby the slidable thrust ring towards the other stationary thrust ring whereby the ball members are urged radially inwardly by the conical thrust ring faces. A separate operating spindle is axially adjustably mounted in the housing and has an elongate tapering end portion projecting through the central openings of the two thrust rings, thus forming an adjustable tapering holding surface for the ball members urged radially inwardly by the pressure of the spring. By this arrangment it is obtained that when in the open position of the valve the operating spindle is moved inwardly the tapering end portion thereof presses the ball members radially outwardly moving the thrust rings further apart whereby the slidable thrust ring and thus the valve stem with the valve element are urged to the closed valve position. Because of the small angle of taper of the elongate tapering end portion of the valve stem, in this transmission of movement between the operating spindle and the valve stem the stroke of the spindle is considerably larger than the stroke of the valve stem between the open and closed positions of the valve element and consequently the operating force to be applied to the operating spindle for overcoming the fluid pressure opposing the closing movement is correspondingly considerably decreased. A comparison with conventional valve operating mechanisms has shown that in case of an operating spindle carried out as a manually operated screwed spindle of conventional type the turning moment required for closing the valve against high fluid pressures can thus be lowered by approximately 80%. Furthermore, when required, it is now also possible to use, instead of a screwed spindle, an axially slidably mounted operating spindle which can be operated pneumatically or hydraulically with relatively low operating pressures. Also the advantage is obtained that by the increased stroke of the operating spindle a clear indication of the position of this spindle is possible.

When in the closed position of the valve the operating spindle is moved outwardly, the spring urges the valve spindle with the valve element and the slidable thrust ring likewise outwardly moving the ball members radially inwardly in contact with the tapering end portion of the spindle.

BRIEF DESCRIPTION OF THE DRAWINGS

The present invention will be more readily understood and the further objects and advantages thereof will be more apparant when read in conjunction with the accompanying drawing.

The drawing shows in longitudinal section a preferred embodiment of the operating mechanism for a high-pressure valve according to the invention in which in the left hand side of the single FIGURE the valve is shown in the closed position and in the right hand side in the open position.

DESCRIPTION OF THE PREFERRED EMBODIMENT

Referring to the drawing, the operating mechanism there shown has a three-part housing with a lower housing part 1, a middle housing part 2 sealingly secured by welding on the housing part 1, and a housing cover 3 screwed onto the middle housing part 2. The lower housing part 1 has a threaded end portion 4 which is screwed into a threaded bore 5 of a valve body 6 of a high-pressure valve. This valve may be of any known type, and is, therefore, not further shown in detail except that an inlet channel for a high-pressure fluid opens centrally into the bottom of the bore 5 forming a valve seat 7 in the bore bottom. An outlet passage (not shown in the drawing) is connected to the part of the bore 5 between the lower end of the threaded end portion 4 of the housing part 1 and the bottom of the bore in a conventional manner. The passage of the valve seat 7 has a diameter of approximately 5 mm.

A valve stem 9 is axially slidably received in the end portion 4 of the lower housing part 1 which stem supports at its lower end a valve element 10 of hemispherical shape for cooperation with the valve seat 7.

In the embodiment as shown the valve stem 9 forms a bellows spindle for a bellows seal arranged in an enlarged upper portion of the lower housing part 1 and comprising a bellows 11 secured by welding at its lower end to a thickened annular portion 12 formed on the stem 9 and at its upper end to a bushing 14 projecting downwardly from a bottom wall 13 of the middle housing part 2 into the lower housing part 1. A bellows seal for the valve stem 9 of this type is as such wellknown in the art. Instead of such a bellows seal it is also possible to provide a diaphragm seal of known type or in certain cases a gland sealing round the valve stem 9. As appears from the drawing, in the open position of the valve the high pressure of the fluid in the channel 8 acts on the bellows seal in the housing 1 which seal has a cross-sectional area substantially larger than that of the valve element 10 and having for instance a diameter of approximately 25 mm. Because of this, a large compressive force has to be imparted to the valve stem 9 for closing the valve. The stroke of the valve stem 9 between its open and closed position is, however, relatively small.

The upper part of the valve stem 9 is slidingly received in the bore of the bushing 14 and extends with a threaded upper end into the middle housing part 2. An adjusting ring 15 is screwed on the valve stem upper end and fits with small lateral play in the middle housing part 2 so as to be axially slidable therein. Spring means in the form of a pile of annular Belleville washers 17 are arranged between the lower end face of the adjusting ring 15 and a supporting washer 16 resting on the bottom wall 13 of the middle housing 2. These spring means 17 thus urge the adjusting ring 15 and thereby the valve stem 9 upwardly towards the open position, as shown at right in the drawing, in which a shoulder 18 on the valve stem 9 abuts the bushing 14.

The adjusting ring 15 supports a movable thrust ring 19 which is axially slidable in the bore of the housing part 2 and the corresponding bore of the housing cover 3 screwed thereon. The movable thrust ring 19 has its upper end face formed as a pressure surface 20 of conical shape as shown. A similar stationary thrust ring 22 bears against a shoulder 21 formed inside the housing cover 3 which thrust ring 22 has a lower end face formed as a conical pressure surface 23 situated opposite the pressure surface 20 and forming the mirror image of the latter. The two pressure surfaces 20 and 23 enclose therebetween an annular space 24 of radially inwardly increasing axial width. This annular space 24 receives a circular row of balls 25 which project radially inwardly into the central bore of the ring assembly 19, 22 in the open position as also in the closed position of the valve.

The housing cover 3 has a threaded bore 26 which engages a threaded operating spindle 27, the spindle having an outer end projecting outwardly of the cover 3 and provided with a handgrip 28. At its lower or inner end the screwed spindle 27 is formed with an elongate inwardly tapering end portion 29 extending through the central opening of the ring assembly 19, 22 and forming a tapering holding surface for the balls 25 as these are urged radially inwardly by the conical pressure surfaces 20 and 23 of the rings 19 and 22 under the action of the spring means 17.

In the open position of the valve, as shown at right in the drawing, the operating spindle 27 has been turned outwardly to a position in which a conical shoulder 30 formed thereon abuts a seat 31 formed in the housing cover 3. By suitable adjustment of the adjustment ring 15 on the upper end of the valve stem 9 the shoulder 18 on the stem 9 engages in this position the lower end of the bushing 14 under the pressure of the spring means 17 while the balls 25 engage the narrow lower end of the tapering spindle end portion 29 which terminates in a short cylindrical tip 32. When the valve must be closed, the operating spindle 27 is manually turned by means of the handgrip 28 so as to be moved axially inwardly into the cover 3 whereby the tapering spindle end portion 29 moves the balls 25 gradually radially outwardly further into the annular space 24 between the pressure surfaces 20 and 23. The balls 25 thus urge the movable thrust ring 19 axially downwardly together with the adjusting ring 15 and the valve stem 9 secured thereto until the valve element 10 engages the valve seat 7. In the closed valve position shown at left in the drawing the balls 25 engage the tapering spindle end portion 29 at a small distance from the upper end thereof and the lower end of this tapering stem portion together with the cylindrical tip 32 thereof extend into a recess 33 formed for that purpose in the upper end of the valve stem 9. As appears from the drawing, in consequence of the small angle of taper of the elongate tapering spindle end portion 29 the axial stroke of the operating spindle 27 is substantially larger than the stroke of the valve stem 9 between the open and closed positions of the valve element 10 and as a result thereof the turning moment to be applied to the operating spindle 27 for overcoming the opposing high fluid pressure in the passage 8 when closing the valve is correspondingly smaller.

For opening the valve the operating spindle 27 together with the taperingend portion 29 thereof is turned in the opposite direction by means of handgrip 28 whereby the spring means 17 in combination with the conical pressure surfaces 20 and 23 of the movable thrust ring 19 and the stationary thrust ring 22, respectively, can again urge the balls 25 radially inwardly allowing the adjusting ring 15 together with the valve stem 9 to move upwardly to lift the valve element 10 from the seat 7 whereby the fluid can again flow through the valve.

While the invention has been illustrated and described with reference to a specific embodiment thereof, it will be understood that other embodiments may be resorted to within the scope of the following claims.

What is claimed is:

1. An operating mechanism for a high-pressure valve having a valve body with a valve passage of relatively small width and a movable valve element for opening and closing said passage, said mechanism comprising valve stem means carrying said valve element at one end thereof, a housing adapted to be mounted on said valve body and receiving said valve stem means for axial sliding movement, sealing means for sealing said valve stem means with respect to said housing, a first stationary thrust ring in said housing having a central opening, a second movable thrust ring in said housing axially spaced from said first thrust ring and having a central opening coaxial with said first thrust ring central opening, said second thrust ring being axially movable with respect to said first thrust ring, each one of said two thrust rings having on its side facing the other of said thrust rings an annular end face having an inwardly bevelled conical shape whereby said two opposing end faces of said two thrust rings enclose therebetween an annular space of radially inwardly increasing axial width, a plurality of ball members arranged in said annular space between said conical thrust ring end faces, said valve stem means on the side opposite of said valve element axially engaging said second movable thrust ring, spring means between said housing and said valve stem means urging the latter against said second movable thrust ring and thereby urging said second thrust ring towards said first thrust ring whereby said ball members are urged radially inwardly by said conical thrust ring end faces, and an operating spindle axially adjustably mounted in said housing, said spindle having an elongate tapering end portion projecting through said central openings of said two thrust rings and forming an adjustable tapering holding surface for said ball members urged radially inwardly by the pressure of said spring means.

2. The operating mechanism of claim 1, further comprising an adjusting ring threadedly mounted on the end of said valve stem means opposite of said valve element, said adjusting ring supporting said second movable thrust ring, and said spring means acting on said adjusting ring to urge the latter against said second movable thrust ring.

3. The operating mechanism of claim 2 in which said housing comprises a first lower housing part adapted to be mounted on said valve body and enclosing said valve stem means and said sealing means, a cup-shaped middle housing part sealingly secured on said lower housing part and having a bottom wall provided with a central bore slidingly receiving said stem means, said middle housing part enclosing said adjusting ring and said spring means arranged about said stem means between said adjusting ring and said middle housing part bottom wall, and a cover part secured onto said middle housing part and having an inner shoulder forming a support for said first stationary thrust ring, said operating spindle projecting outwardly from said cover part.

4. The mechanism of claim 3, in which said spring means comprise a number of annular Belleville washers arranged about said stem means.

5. The mechanism of claim 1 in which said sealing means is a bellows seal comprising a bellows having one end sealingly secured to said stem means and having its other end sealingly secured to said housing.

6. The mechanism of claim 3 in which said housing cover part has a threaded central bore, said operating spindle forming a screwed spindle threadedly received in said bore.

* * * * *